United States Patent
Pan

(12) 
(10) Patent No.: US 8,488,281 B1
(45) Date of Patent: Jul. 16, 2013

(54) DISK DRIVE SUSPENSION ASSEMBLY HAVING A FLEXURE BOND PAD SHELF SEPARATE FROM A TONGUE

(75) Inventor: Tzong-Shii Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 6 days.

(21) Appl. No.: 13/231,685

(22) Filed: Sep. 13, 2011

(51) Int. Cl.
- *G11B 21/24* (2006.01)
- *G11B 5/56* (2006.01)
- *G11B 5/58* (2006.01)

(52) U.S. Cl.
USPC ............... 360/294.4; 360/244.2; 360/245.2; 360/245.9; 360/294.7

(58) Field of Classification Search
USPC ....... 360/245.9, 294.4, 244.1–246, 294–294.7
See application file for complete search history.

(56) References Cited

U.S. PATENT DOCUMENTS

| | | | |
|---|---|---|---|
| 5,870,258 A | 2/1999 | Khan et al. | |
| 5,883,758 A | 3/1999 | Bennin et al. | |
| 5,956,212 A | 9/1999 | Zhu | |
| 6,249,404 B1 | 6/2001 | Doundakov et al. | |
| 6,459,549 B1 | 10/2002 | Tsuchiya et al. | |
| 6,515,832 B1 | 2/2003 | Girard | |
| 6,965,499 B1 | 11/2005 | Zhang et al. | |
| 6,993,824 B2 | 2/2006 | Childers et al. | |
| 7,002,780 B2 | 2/2006 | Rancour et al. | |
| 7,113,372 B2 | 9/2006 | Segar et al. | |
| 7,403,357 B1 | 7/2008 | Williams | |
| 7,411,764 B2 | 8/2008 | Yang et al. | |
| 7,525,769 B2 | 4/2009 | Yao et al. | |
| 7,545,605 B2 | 6/2009 | Hagiya et al. | |
| 7,554,773 B2 | 6/2009 | Zhu et al. | |
| 7,567,410 B1 | 7/2009 | Zhang et al. | |
| 7,593,190 B1 | 9/2009 | Thornton et al. | |
| 7,663,843 B2 | 2/2010 | Yao | |
| 7,688,553 B1 | 3/2010 | Williams et al. | |
| 7,697,237 B1 | 4/2010 | Danielson | |
| 8,027,128 B2 | 9/2011 | Muraki et al. | |
| 8,130,470 B2 | 3/2012 | Muraki et al. | |
| 2004/0226164 A1 | 11/2004 | Girard | |
| 2004/0246625 A1 | 12/2004 | Tsuchida et al. | |
| 2005/0117257 A1 | 6/2005 | Thaveeprungsriporn et al. | |
| 2006/0262456 A1 | 11/2006 | Wang et al. | |
| 2008/0144223 A1 | 6/2008 | Muraki et al. | |
| 2008/0144225 A1 | 6/2008 | Yao et al. | |
| 2008/0180850 A1 | 7/2008 | Rice et al. | |
| 2009/0080116 A1* | 3/2009 | Takahashi et al. ......... 360/294.4 |

* cited by examiner

*Primary Examiner* — Craig A. Renner
*Assistant Examiner* — Gustavo Polo

(57) ABSTRACT

A disk drive includes a suspension assembly that includes a load beam and a laminated flexure. The laminated flexure includes a structural layer, a dielectric layer, and an electrically conductive layer. The electrically conductive layer includes a plurality of flexure bond pads. The structural layer includes a tongue and a flexure bond pad shelf. The flexure bond pad shelf underlies each of the plurality of flexure bond pads. The flexure bond pad shelf is separate from the tongue in the structural layer so that the structural layer nowhere connects the flexure bond pad shelf to the tongue. A fine actuator may be disposed on and bonded to the tongue to produce relative motion between the head and the tongue. With the flexure bond pads bonded to the plurality of head bond pads, the fine actuator may also produce relative motion between the flexure bond pad shelf and the tongue.

20 Claims, 6 Drawing Sheets

DISK DRIVE SUSPENSION ASSEMBLY HAVING A FLEXURE BOND PAD SHELF SEPARATE FROM A TONGUE

BACKGROUND

Magnetic hard disk drives retrieve and/or store data in computers and other consumer electronics devices. A magnetic hard disk drive includes one or more heads that can read and write information on a corresponding magnetic surface of a spinning disk. Each head is a sub-component of a head gimbal assembly (HGA). The HGA also includes a suspension assembly for holding the head and providing a plurality of electrical connections thereto. The suspension assembly typically includes a load beam, and a fragile laminated flexure to carry the electrical signals to and from the head.

The head typically comprises a slider that includes an air bearing surface (ABS) that faces the magnetic disk surface, a trailing face, and a back face that is opposite the ABS and that faces away from the ABS. A magnetic sensor and a plurality of head bond pads are typically disposed on the trailing face of the slider. Conventionally, the back face of the slider is typically permanently bonded to a tongue portion of the fragile laminated flexure by an adhesive, in a position such that the plurality of head bond pads are aligned with corresponding bond pads on the laminated flexure.

However, market demand for disk drives with higher areal data density has motivated development of conventional fine actuators to produce relative motion between the flexure tongue and the head. Such conventional fine actuators are intended to desirably enable the head to read and write with smaller spacing between data tracks written on the disk. But the actual relative motion between the flexure tongue and the head produced by such fine actuators may be hindered or limited by conventional flexure designs, which may not be compliant enough to allow such relative motion without unacceptably high force, torque, and/or stress.

For example, in some cases, a conventional flexure may have acceptable compliance until its flexure bond pads are bonded to the head, after which the conventional flexure presents unacceptably high stiffness to the fine actuator. Hence, there is a need in the art for a flexure design that is compliant enough (after bonding of the flexure bond pads) to allow a conventional fine actuator to produce relative motion between the flexure tongue and the head, with increased stroke and/or reduced force, torque, or stress.

DESCRIPTION OF EXAMPLE EMBODIMENTS

Figure 1:
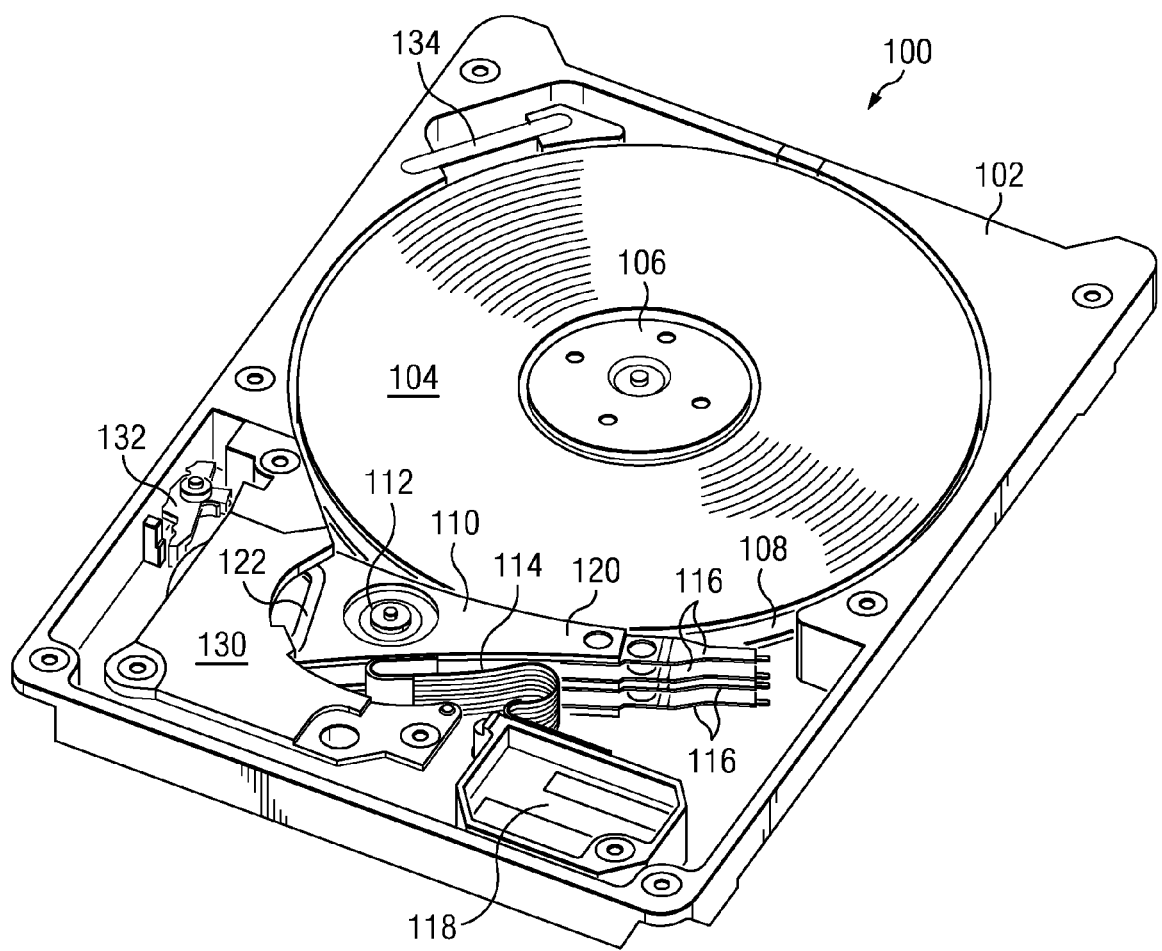
FIG. 1 is a perspective view of a disk drive capable of including an embodiment of the present invention.

FIG. 1 is a perspective view of a disk drive 100 capable of including an embodiment of the present invention. The disk drive 100 includes a disk drive base 102, and a disk 104 rotably mounted to the disk drive base 102 by a spindle motor 106. The disk drive 100 optionally includes a second disk 108, also rotably mounted to the disk drive base 102 by spindle motor 106. The disks 104, 108 may comprise a conventional aluminum, glass, or ceramic substrate, with the substrate being coated with a NiP under-layer, a thin-film magnetic layer, a diamond-like amorphous carbon protective layer, and a very thin lubricant layer. Co-rotation of the disks 104, 108 can induce air flow through a recirculation filter 134 that may reduce particulate contamination of the surfaces of the disks 104, 108.

The disk drive 100 also includes an actuator 110 that is rotably mounted to the disk drive base 102 by a pivot bearing 112 that is inserted as a cartridge into a bore in the actuator 110. The actuator 110 may be fabricated from aluminum, magnesium, beryllium, or stainless steel, for example. The pivot bearing 112 may be retained in the bore by a conventional tolerance ring, or may be otherwise retained (e.g. by an adhesive). The angular range of motion of the actuator 110 may be limited by a latch and crash stop mechanism 132. The actuator 110 includes at least one actuator arm 120 that extends away from the pivot bearing 112, and an actuator coil 122 that extends away from the pivot bearing 112 in a direction generally opposite the actuator arm 120. A portion of the actuator coil 122 is obscured behind a top plate 130 of a yoke structure of a voice coil motor (VCM) in the view of FIG. 1.

The top plate 130 may support an upper permanent magnet of the VCM, and may be disposed over a bottom plate (not shown because obscured by the top plate 130 in the view of FIG. 1) that may support a lower permanent magnet of the VCM. The top plate 130 and/or the bottom plate form a yoke and preferably comprise a ferromagnetic metal so as to provide a return path for magnetic flux from the permanent magnet(s). The ferromagnetic metal yoke structure including the top plate 130 is preferably affixed to the disk drive base 102, for example by an adhesive, one or more fasteners, and/or magnetic attraction.

A plurality of head gimbal assemblies 116 is attached to arms of the actuator 110, for example by swaging. A flexible printed circuit (FPC) 114 (also known as a "flex cable") is also attached to the actuator 110. Each of the head gimbal assemblies 116 includes a laminated flexure having a flexure tail that is electrically connected to the FPC 114. The FPC 114 can communicate electrical signals, via these electrical connections and via a flex bracket 118, between the head gimbal assemblies 116 and an external electronic system that is disposed on a printed circuit board (not shown).

The actuator 110, head gimbal assemblies 116, and FPC 114 may be collectively referred to as a head stack assembly (HSA). The disk drive 100 may also include a conventional head loading ramp, that may be positioned adjacent the disks 104, 108 to facilitate merging of the head gimbal assemblies 116 onto surfaces of the disks 104, 108. However, such conventional ramp is not shown in FIG. 1 for a more clear view of the head gimbal assemblies 116.

Figure 2:
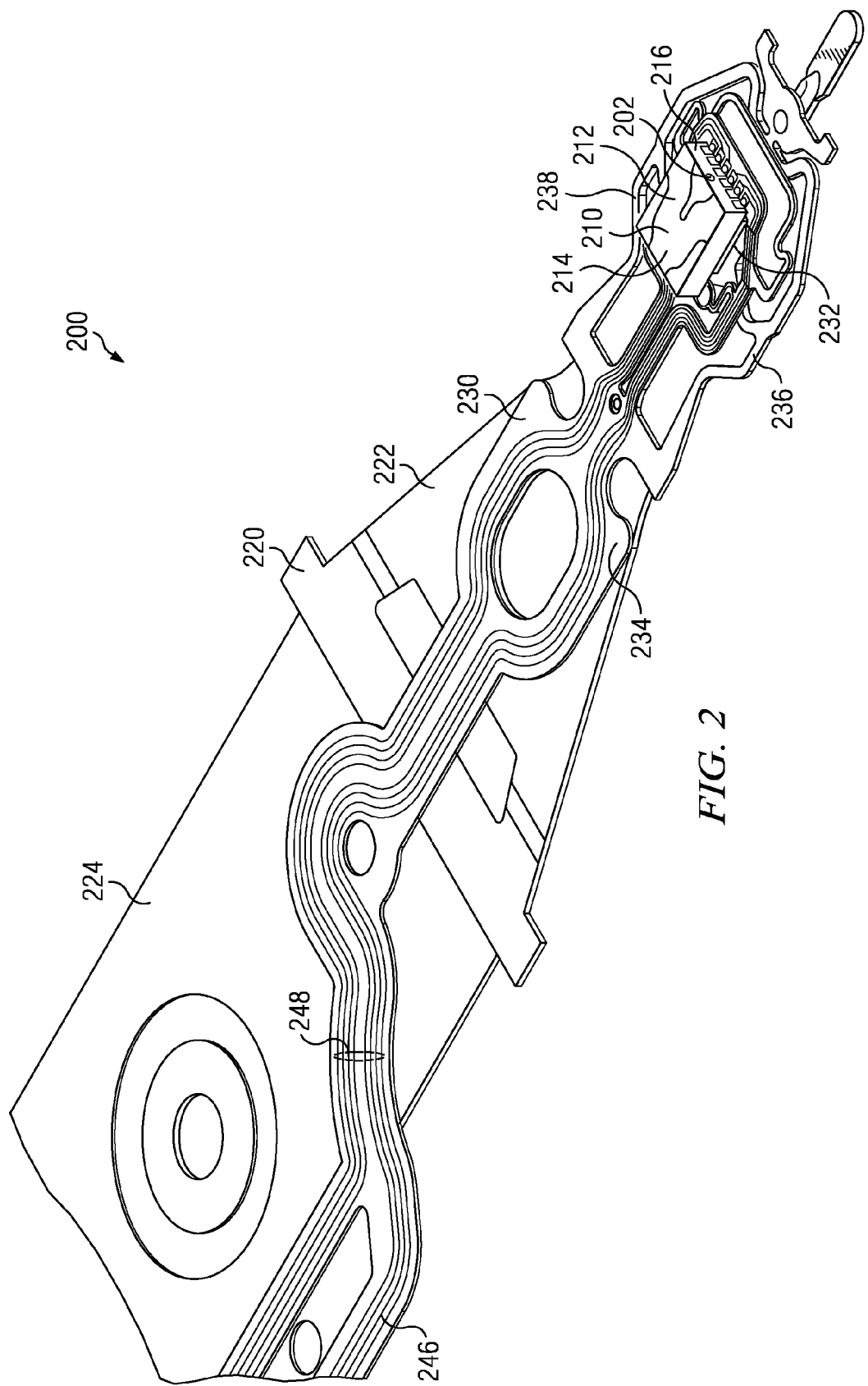
FIG. 2 depicts a head gimbal assembly (HGA), according to an embodiment of the present invention.

FIG. 2 depicts a head gimbal assembly (HGA) 200, according to an embodiment of the present invention. The HGA 200 includes a head 210 that comprises a slider 212 that includes an air bearing surface (ABS) 214 and a trailing face 216. The slider may comprise a ceramic material such as AlTiC, for example. The head 210 also comprises a magnetic sensor 202 that is disposed on the trailing face 216 of the slider 212. The magnetic sensor 202 may include a magneto-resistive read sensor and a magneto-inductive write transducer, for example.

In the embodiment of FIG. 2, the HGA 200 includes a suspension assembly 220 that may comprise a load beam 222, a swage plate 224, and a laminated flexure 230. The laminated flexure 230 includes a structural layer (e.g. stainless steel) and a conductive layer (e.g. copper) separated by a dielectric layer (e.g. polyimide). The structural layer includes a tongue 232. A first side of the tongue 232 may be in contact with the load beam 222, for example via a conventional dimple that transfers a preload force (also known as a "gram load") from the load beam 222 to the head 210 to preload the head 210 against the surface of a rotating disk during disk drive operation. The structural layer of the laminated flexure 230 also includes a flexure base region 234 that is contiguous with the tongue 232. The flexure base region 234 is attached to the load beam 222, for example by spot welding the load beam 222 to a structural layer of the laminated flexure 230 in the flexure base region 234.

In the embodiment of FIG. 2, the structural layer of the laminated flexure 230 includes a plurality of flexure arms 236, 238, each extending from the flexure base region 234 and adjoining to the flexure tongue 232 at a respective one of a plurality of adjoining locations. The laminated flexure 230 includes a flexure tail 246 that extends to connect with a flexible printed circuit (FPC) attached to an actuator. The laminated flexure 230 also includes a plurality of conductive leads 248 that run from the flexure tail 246 to the head 210. The conductive leads 248 may comprise copper, for example. A dielectric layer separates the conductive leads 248 from the structural layer of the flexure 230.

Figure 3A:
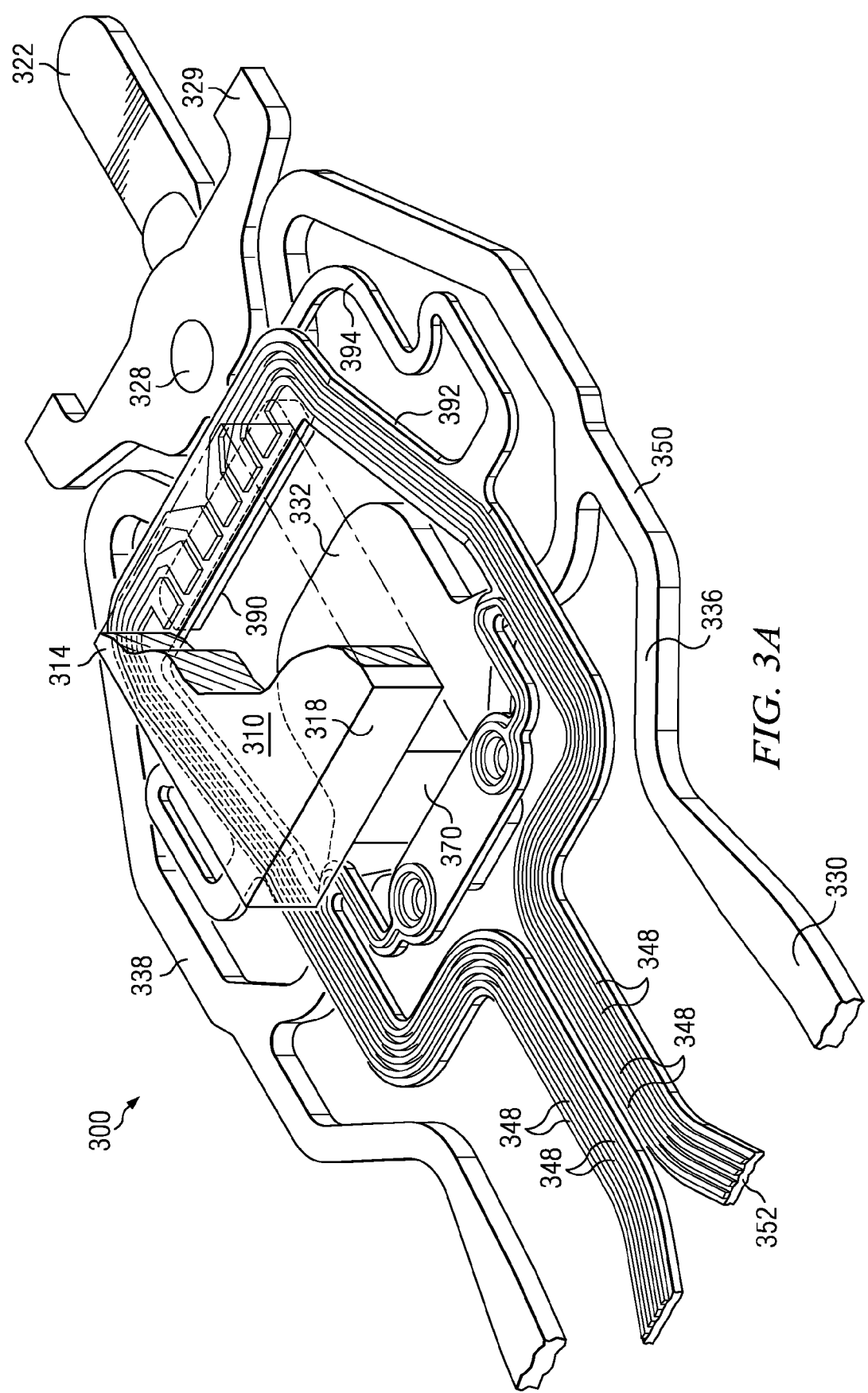
FIG. 3A is a perspective view of a distal portion of a HGA, according to an embodiment of the present invention.
Figure 3B:
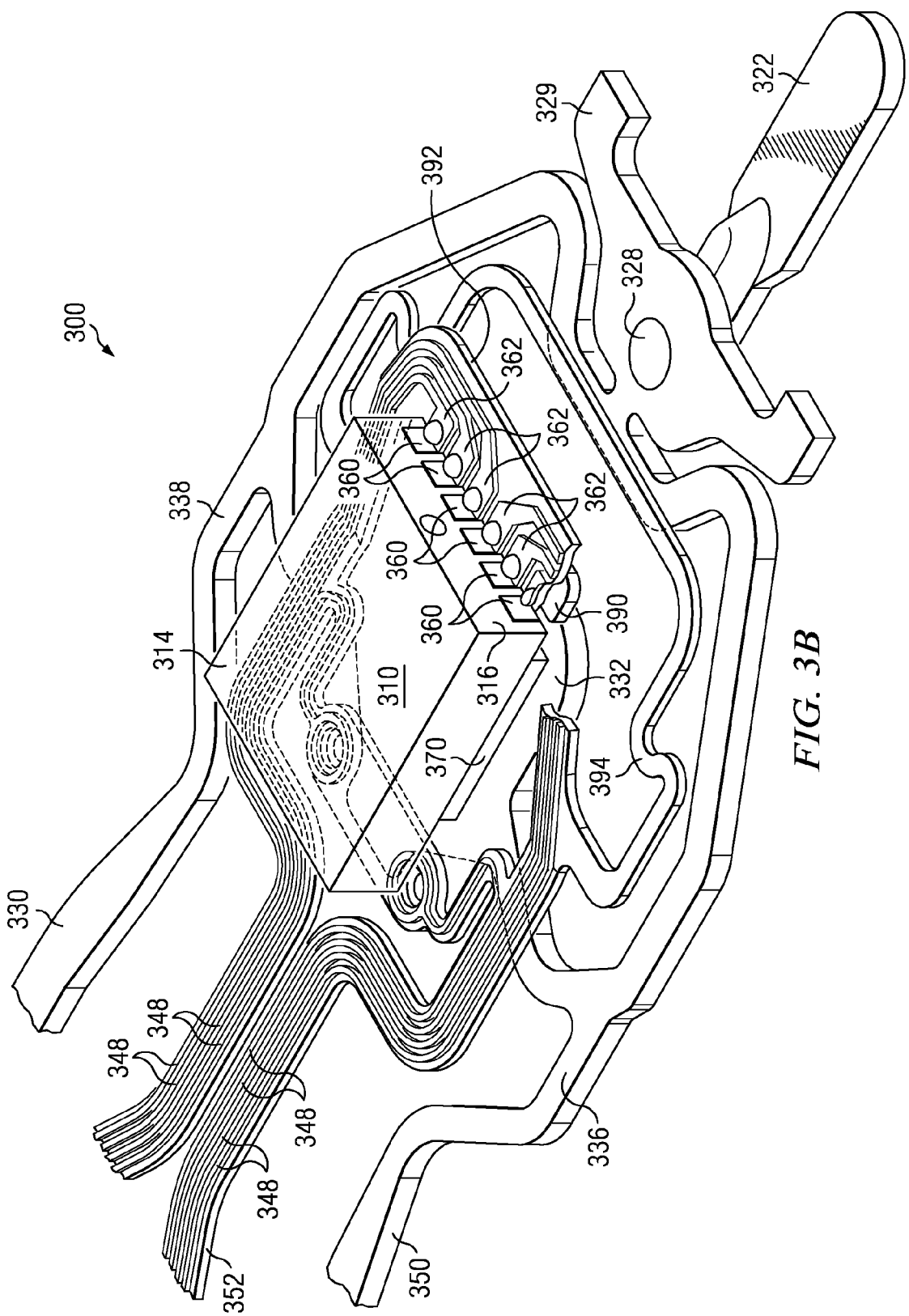
FIG. 3B is a cut-away perspective view of the distal portion of FIG. 3A.

FIG. 3A is a perspective view of a distal portion of a HGA 300, according to an embodiment of the present invention. FIG. 3B is a cut-away perspective view of the distal portion of the HGA 300. Now referring to FIGS. 3A-B, the HGA 300 includes a head 310 that comprises a slider that includes an air bearing surface (ABS) 314, a trailing face 316, and a leading face 318. The ABS 314 may be of conventional design, and detailed ABS features are not shown in FIGS. 3A and 3B so that the underlying structure shown in phantom lines will not be obscured or confused. The head 310 comprises a magnetic sensor that is disposed on the trailing face 316 of the slider. The head 310 also comprises a plurality of head bond pads 360 that are disposed on the trailing face 316 and that are electrically conductive. The head bond pads 360 may comprise gold and/or copper, for example.

In the embodiment of FIGS. 3A-B, the HGA 300 includes a suspension assembly that comprises a load beam 322 and a laminated flexure 330. The laminated flexure includes a structural layer 350, a dielectric layer 352, and an electrically conductive layer that includes a plurality of electrically conductive traces 348 (each terminating at a respective one of a plurality of flexure bond pads 362). The structural layer 350 of the flexure 330 may comprise stainless steel, for example. The dielectric layer 352 of the flexure 330 may comprise polyimide, for example. The electrically conductive layer of the flexure 330, including the plurality of electrically conductive traces 348 and the plurality of flexure bond pads 362, may comprise copper, for example.

The structural layer 350 includes a tongue 332. A first side of the tongue 332 (underside as viewed in FIGS. 3A-B) may be in contact with the load beam 322, for example via a conventional dimple that transfers a preload force (also known as a "gram load") from the load beam 322 to the head 310 to preload the head 310 against the surface of a rotating disk during disk drive operation. An opposing second side of the tongue 332 (upper side as viewed in FIGS. 3A-B) may be attached to a fine actuator 370 (e.g. a conventional piezoelectric microactuator, electrostatic microactuator, electromagnetic microactuator, micro-machined microactuator, etc) to produce relative motion between the head 310 and the tongue 332. The fine actuator 370 may be disposed on and bonded to the tongue 332, with the head 310 being attached to the fine actuator 370.

The structural layer 350 also includes a flexure bond pad shelf 390. The flexure bond pad shelf 390 is separate from the tongue 332 in the structural layer 350, so that the structural layer 350 nowhere connects the flexure bond pad shelf 390 to the tongue 332. For example, the flexure bond pad shelf 390 may comprise a discontinuous island in the structural layer 350. Since the flexure bond pad shelf 390 is separate from the tongue 332 in the structural layer 350, the flexure bond pad shelf 390 may more easily move with the head 310. This may enable the fine actuator 370 to more easily produce relative motion between the head 310 and the tongue 332 (e.g. with less force, lower voltage, or increased stroke), with the fine actuator 370 also producing relative motion between the flexure bond pad shelf 390 and the tongue 332.

In the embodiment of FIGS. 3A and 3B, a major surface of the tongue 332 is parallel to but offset from a major surface of the flexure bond pad shelf 390. For example, in certain embodiments the flexure bond pad shelf 390 is preferably offset from a major surface of the tongue 332 by an offset distance (measured normal to the ABS 314) that is equal to the thickness of the fine actuator 370 (e.g. 50 to 200 microns). In the embodiment of FIGS. 3A and 3B the offset is created by optionally forming the flexure bond pad shelf 390 upward from the tongue 332. The flexure bond pad shelf 390 underlies each of the plurality of flexure bond pads 362. In this context, to underlie a flexure bond pad does not require physical contact with the flexure bond pad, but rather means to span the flexure bond pad (even though separated by the dielectric layer 352) as viewed from a direction normal to the ABS 314 of the head 310.

In the embodiment of FIGS. 3A-B, the structural layer 350 of the flexure 330 includes a plurality of flexure arms 336, 338, each extending from a flexure base region that is attached to the load beam and adjoining to the flexure tongue 332. Note that in the view of FIG. 3B, some of the conductive leads 348 have been cut away to better depict the tongue 332 and the flexure bond pad shelf 390 of the structural layer 350. The dielectric layer 352 separates the conductive leads 348 from the structural layer 350 of the flexure 330. As shown in FIG. 3B, each of the plurality of flexure bond pads 362 may be bonded to and electrically connected to respective ones of the plurality of head bond pads 360 by a plurality of conductive balls (e.g. ultrasonically bonded gold balls).

In the embodiment of FIGS. 3A and 3B, the flexure bond pad shelf 390 is not attached to the load beam 322, unlike the portion of the structural layer 350 that is contiguous with the tongue (which is attached to the load beam 322 in a region to the left of the views of FIGS. 3A and 3B). Rather, in the embodiment of FIGS. 3A and 3B, narrow bridges 392, 394 in the dielectric layer 352 connect the flexure bond pad shelf 390 to the portion of the structural layer 350 that is contiguous with the tongue 332. The narrow bridge 392, which includes a pre-defined incline portion, underlies electrical traces 348 in the conductive layer, but the narrow bridge 394 does not. In this context, to underlie an electrical trace 348 in the conductive layer means to span the width of the electrical trace 348 as viewed from a direction normal to the ABS 314 of the head 310.

In the embodiment of FIGS. 3A and 3B, the structural layer 350 optionally includes a distal portion 329 that is spot welded to the load beam 322 by spot weld 328. The distal portion 329 is separate from the flexure bond pad shelf 390 in the structural layer, though the narrow bridge 394 in the dielectric layer bridges between the two.

Figure 4A:
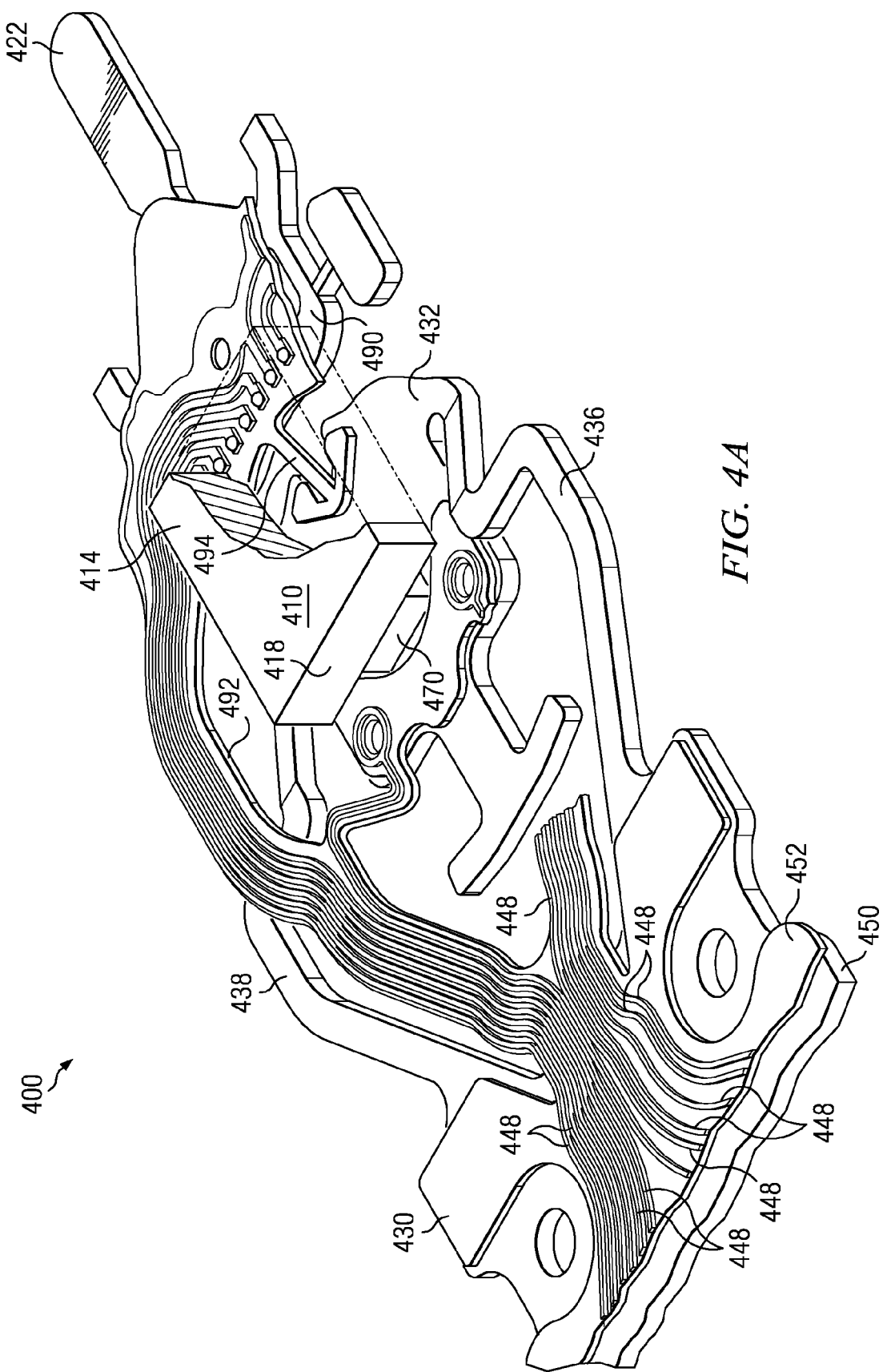
FIG. 4A is a cut-away perspective view of a distal portion of a HGA, according to another embodiment of the present invention.
Figure 4B:
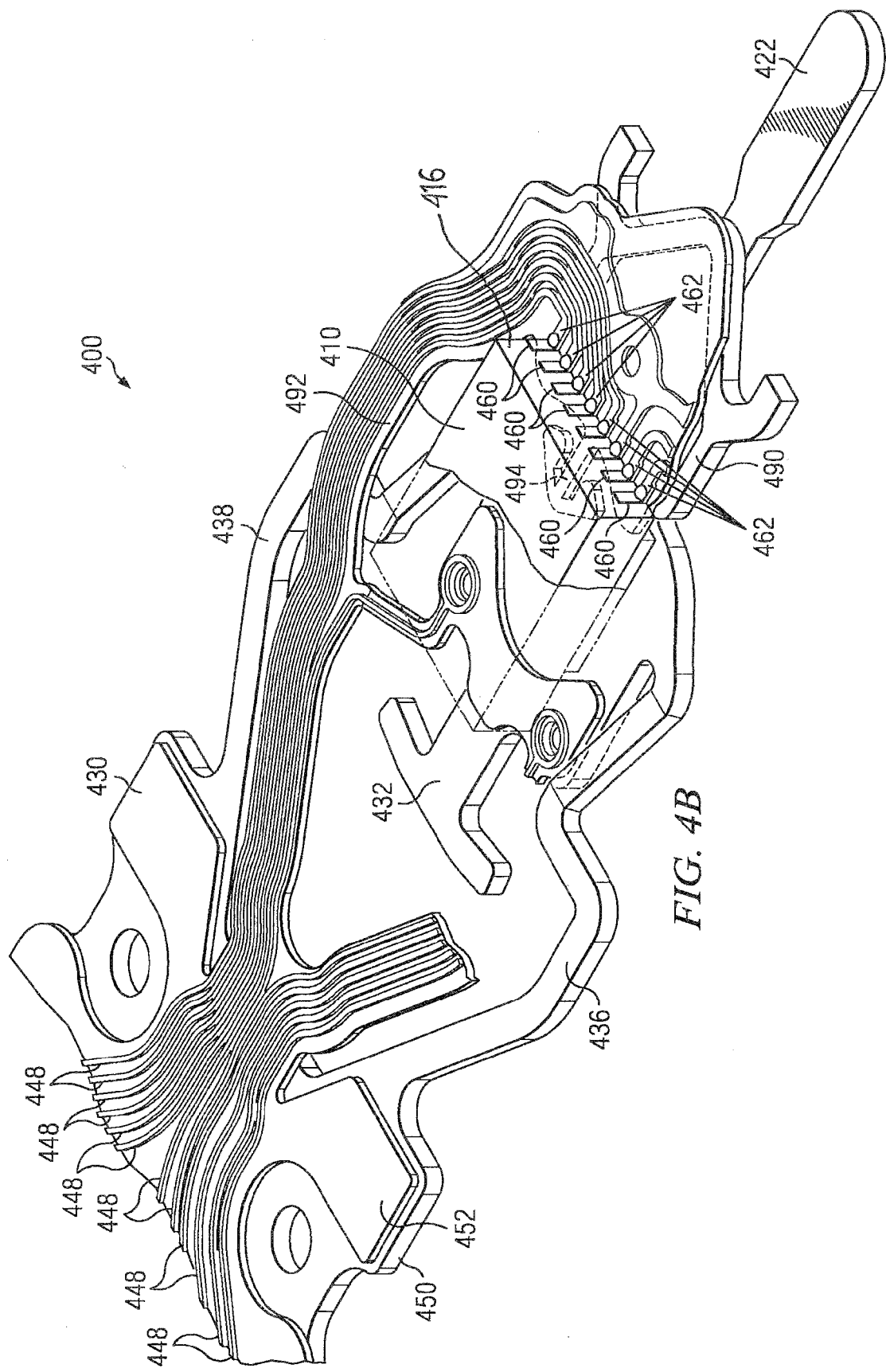
FIG. 4B is another cut-away perspective view of the distal portion of FIG. 4A.

FIG. 4A is a cut-away perspective view of a distal portion of a HGA 400, according to another embodiment of the present invention. FIG. 4B is another cut-away perspective view of the distal portion of the HGA 400. Now referring to FIGS. 4A-B, the HGA 400 includes a head 410 that comprises a slider that includes an air bearing surface (ABS) 414, a trailing face 416, and a leading face 418. The ABS 414 may be of conventional design, and detailed ABS features are not shown in FIGS. 4A and 4B so that the underlying structure shown in phantom lines will not be obscured or confused. The head 410 comprises a magnetic sensor that is disposed on the trailing face 416 of the slider. The head 410 also comprises a plurality of head bond pads 460 that are disposed on the trailing face 416 and that are electrically conductive. The head bond pads 460 may comprise gold and/or copper, for example.

In the embodiment of FIGS. 4A-B, the HGA 400 includes a suspension assembly that comprises a load beam 422 and a laminated flexure 430. The laminated flexure includes a structural layer 450, a dielectric layer 452, and an electrically conductive layer that includes a plurality of electrically conductive traces 448 (each terminating at a respective one of a plurality of flexure bond pads 462). The structural layer 450 of the flexure 430 may comprise stainless steel, for example. The dielectric layer 452 of the flexure 430 may comprise polyimide, for example. The electrically conductive layer of the flexure 430, including the plurality of electrically conductive traces 448 and the plurality of flexure bond pads 462, may comprise copper, for example.

The structural layer 450 includes a tongue 432. A first side of the tongue 432 (underside as viewed in FIGS. 4A-B) may be in contact with the load beam 422, for example via a conventional dimple that transfers a preload force (also known as a "gram load") from the load beam 422 to the head 410 to preload the head 410 against the surface of a rotating disk during disk drive operation. An opposing second side of the tongue 432 (upper side as viewed in FIGS. 4A-B) may be attached to a fine actuator 470 (e.g. a conventional piezoelectric microactuator, electrostatic microactuator, electromagnetic microactuator, micro-machined microactuator, etc) to produce relative motion between the head 410 and the tongue 432. The fine actuator 470 may be disposed on and bonded to the tongue 432, with the head 410 being attached to the fine actuator 470.

The structural layer 450 also includes a flexure bond pad shelf 490. The flexure bond pad shelf 490 is separate from the tongue 432 in the structural layer 450, so that the structural layer 450 nowhere connects the flexure bond pad shelf 490 to the tongue 432. For example, the flexure bond pad shelf 490 may comprise a discontinuous island in the structural layer 450. Since the flexure bond pad shelf 490 is separate from the tongue 432 in the structural layer 450, the flexure bond pad shelf 490 may more easily move with the head 410. This may enable the fine actuator 470 to more easily produce relative motion between the head 410 and the tongue 432 (e.g. with less force, lower voltage, or increased stroke), with the fine actuator 470 also producing relative motion between the flexure bond pad shelf 490 and the tongue 432.

In the embodiment of FIGS. 4A and 4B, a major surface of the tongue 432 is parallel to but offset from a major surface of the flexure bond pad shelf 490. For example, in certain embodiments the flexure bond pad shelf 490 is preferably offset from a major surface of the tongue 432 by an offset distance (measured normal to the ABS 414) that is equal to the thickness of the fine actuator 470 (e.g. 50 to 200 microns). In the embodiment of FIGS. 4A and 4B the offset is created by optionally forming the tongue 432 downward from the flexure bond pad shelf 490. The flexure bond pad shelf 490 underlies each of the plurality of flexure bond pads 462. In this context, to underlie a flexure bond pad does not require physical contact with the flexure bond pad, but rather means to span the flexure bond pad (even though separated by the dielectric layer 452) as viewed from a direction normal to the ABS 414 of the head 410.

In the embodiment of FIGS. 4A-B, the structural layer 450 of the flexure 430 includes a plurality of flexure arms 436, 438, each extending from a flexure base region that is attached to the load beam and adjoining to the flexure tongue 432. Note that in the views of FIGS. 4A and 4B, some of the conductive leads 448 have been cut away to better depict the tongue 432 and the flexure bond pad shelf 490 of the structural layer 450. The dielectric layer 452 separates the conductive leads 448 from the structural layer 450 of the flexure 430. As shown in FIG. 4B, each of the plurality of flexure bond pads 462 may be bonded to and electrically connected to respective ones of the plurality of head bond pads 460 by a plurality of conductive balls (e.g. ultrasonically bonded gold balls).

In the embodiment of FIGS. 4A and 4B, the flexure bond pad shelf 490 is not attached to the load beam 422, unlike the portion of the structural layer 450 that is contiguous with the tongue (which is attached to the load beam 422 in a region to the left of the views of FIGS. 4A and 4B). Moreover, in the embodiment of FIGS. 4A and 4B, the structural layer 450 does not include a distal portion that is spot welded to the load beam 422. In the embodiment of FIGS. 4A and 4B, narrow bridges 492 and 494 in the dielectric layer 452 connect the flexure bond pad shelf 490 to the portion of the structural layer 450 that is contiguous with the tongue 432. The narrow bridge 492 underlies electrical traces 448 in the conductive layer, but the narrow bridge 494 does not. In this context, to underlie an electrical trace 448 in the conductive layer means to span the width of the electrical trace 448 as viewed from a direction normal to the ABS 414 of the head 410.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A disk drive comprising:
   a disk drive base;
   a disk rotably mounted to the disk drive base;
   a coarse actuator pivotably mounted to the disk drive base; and
   a head gimbal assembly attached to the actuator, the head gimbal assembly comprising:
     a head comprising:
       a slider that includes a trailing face;
       a magnetic sensor that is disposed on the trailing face; and
       a plurality of head bond pads that are disposed on the trailing face and that are electrically conductive;
     a suspension assembly comprising:
       a load beam; and a laminated flexure, the laminated flexure including a structural layer, a dielectric layer, and an electrically conductive layer, the electrically conductive layer including a plurality of flexure bond pads, the structural layer including a tongue and a flexure bond pad shelf, the flexure bond pad shelf being separate from the tongue in the structural layer so that the structural layer nowhere connects the flexure bond pad shelf to the tongue, the flexure bond pad shelf underlying each of the plurality of flexure bond pads; and a fine actuator to produce relative motion between the head and the tongue, the fine actuator being disposed on and bonded to the tongue, the head being attached to the fine actuator;

wherein the plurality of flexure bond pads are bonded to and electrically connected to respective ones of the plurality of head bond pads;

wherein the laminated flexure is configured to facilitate relative motion between the trailing face of the head and the tongue; and wherein the dielectric layer comprises a bridge having a pre-defined incline portion.

2. The disk drive of claim 1 wherein the structural layer comprises stainless steel, the dielectric layer comprises polyimide, and the conductive layer comprises copper.

3. The disk drive of claim 1 wherein a portion of the structural layer that is contiguous with the tongue is attached to the load beam, and the flexure bond pad shelf is not attached to the load beam.

4. The disk drive of claim 3 wherein the bridge in the dielectric layer connects the flexure bond pad shelf to the portion of the structural layer that is contiguous with the tongue.

5. The disk drive of claim 4 wherein the bridge underlies at least one electrical trace in the conductive layer.

6. The disk drive of claim 1 wherein the fine actuator is a piezoelectric microactuator.

7. The disk drive of claim 1 wherein a major surface of the tongue is parallel to but offset from a major surface of the flexure bond pad shelf.

8. The disk drive of claim 1 wherein the flexure bond pad shelf comprises a discontinuous island in the structural layer.

9. The disk drive of claim 1 wherein the fine actuator produces relative motion between the flexure bond pad shelf and the tongue.

10. The disk drive of claim 1 wherein the conductive layer comprises at least one electrical trace extending for a span extending from a flexure tail to one of the plurality of flexure bond pads, wherein the dielectric layer underlies the at least one electrical trace throughout the span.

11. The disk drive of claim 1 wherein the bridge connects the flexure bond pad shelf to a portion of the structural layer that is contiguous with the tongue, wherein the bridge extends along a side of the slider for a distance greater than a length of the side, wherein the side is substantially perpendicular to the trailing face.

12. The disk drive of claim 11 wherein the conductive layer comprises at least one electrical trace terminating at one of the plurality of flexure bond pads, wherein the bridge underlies the at least one electrical trace throughout a length of the bridge.

13. A head gimbal assembly (HGA) for a disk drive, the HGA comprising:

a head comprising:
  a slider that includes a trailing face;
  a magnetic sensor that is disposed on the trailing face; and
  a plurality of head bond pads that are disposed on the trailing face and that are electrically conductive;

a suspension assembly comprising:
  a load beam; and
  a laminated flexure, the laminated flexure including a structural layer, a dielectric layer, and an electrically conductive layer, the electrically conductive layer including a plurality of flexure bond pads, the structural layer including a tongue and a flexure bond pad shelf, the flexure bond pad shelf being separate from the tongue in the structural layer so that the structural layer nowhere connects the flexure bond pad shelf to the tongue, the flexure bond pad shelf underlying each of the plurality of flexure bond pads; and a fine actuator to produce relative motion between the head and the tongue, the fine actuator being disposed on and bonded to the tongue, the head being attached to the fine actuator;

wherein the plurality of flexure bond pads are bonded to and electrically connected to respective ones of the plurality of head bond pads;

wherein the laminated flexure is configured to facilitate relative motion between the trailing face of the head and the tongue; and wherein the dielectric layer comprises a bridge having a pre-defined incline portion.

14. The HGA of claim 13 wherein the structural layer comprises stainless steel, the dielectric layer comprises polyimide, and the conductive layer comprises copper.

15. The HGA of claim 13 wherein a portion of the structural layer that is contiguous with the tongue is attached to the load beam, and the flexure bond pad shelf is not attached to the load beam.

16. The HGA of claim 15 wherein the bridge in the dielectric layer connects the flexure bond pad shelf to the portion of the structural layer that is contiguous with the tongue.

17. The HGA of claim 13 wherein the fine actuator is a piezoelectric microactuator.

18. The HGA of claim 13 wherein a major surface of the tongue is parallel to but offset from a major surface of the flexure bond pad shelf.

19. The HGA of claim 13 wherein the flexure bond pad shelf comprises a discontinuous island in the structural layer.

20. The HGA of claim 16 wherein the bridge underlies at least one electrical trace in the conductive layer.

* * * * *